United States Patent [19]
Malihi

[11] Patent Number: 4,759,865
[45] Date of Patent: Jul. 26, 1988

[54] PASTY ACID DETERGENT COMPOSITION

[75] Inventor: Farrokh B. Malihi, Piscataway, N.J.

[73] Assignee: Colgate-Palmolive Company, New York, N.Y.

[21] Appl. No.: 928,232

[22] Filed: Nov. 6, 1986

[51] Int. Cl.[4] .......... C02F 5/02; C02F 5/08

[52] U.S. Cl. .......... 252/175; 252/142; 252/100; 252/174.19; 252/558; 252/DIG. 14

[58] Field of Search ....... 252/142, 558, 175, DIG. 14, 252/174.19, 100; 401/200, 201; 15/104.93, 104.94

[56] References Cited

U.S. PATENT DOCUMENTS

| | | | |
|---|---|---|---|
| 2,483,135 | 9/1949 | Goldsmith et al. | 252/109 |
| 2,493,327 | 1/1950 | Vance | 148/6.15 |
| 2,558,167 | 6/1951 | Beghin et al. | 252/136 |
| 2,593,259 | 4/1952 | Brissey et al. | 252/136 |
| 2,687,346 | 8/1954 | McDonald | 41/42 |
| 2,896,242 | 7/1959 | Winch | 15/209 |
| 3,014,233 | 12/1961 | Gibbons | 15/568 |
| 3,042,621 | 7/1962 | Kirschenbauer | 252/99 |
| 3,074,099 | 1/1963 | Cameron | 15/506 |
| 3,076,298 | 2/1963 | Tundermann | 53/24 |
| 3,094,735 | 6/1963 | Hanlon | 15/506 |
| 3,178,370 | 4/1965 | Okenfuss | 252/137 |
| 3,284,963 | 11/1966 | Lanham et al. | 51/400 |
| 3,293,684 | 12/1966 | Tundermann | 15/605 |
| 3,337,465 | 8/1967 | Lancz et al. | 252/91 |
| 3,788,999 | 1/1974 | Abler | 252/91 |
| 3,809,535 | 9/1974 | Neel et al. | 8/142 |
| 3,981,826 | 9/1976 | Munro | 252/526 |
| 3,993,575 | 11/1976 | Howanitz | 252/142 |
| 4,210,550 | 7/1980 | Cornelissens | 252/90 |
| 4,234,442 | 11/1980 | Cornelissens | 252/90 |
| 4,465,612 | 8/1984 | Altenschöpfer | 252/143 |
| 4,501,680 | 2/1985 | Aszman et al. | 252/142 |
| 4,532,064 | 7/1985 | Boskamp | 252/105 |
| 4,581,161 | 4/1986 | Nedonchelle | 252/550 |
| 4,587,030 | 5/1986 | Casey | 252/92 |
| 4,619,710 | 10/1986 | Kuenn | 134/22.17 |
| 4,623,399 | 11/1986 | Frenier | 134/3 |

*Primary Examiner*—Paul Lieberman
*Assistant Examiner*—Isabelle Rodriguez
*Attorney, Agent, or Firm*—Marta E. Delsignore; Richard J. Ancel; Murray M. Grill

[57] ABSTRACT

A pasty acid detergent composition for cleaning bathroom surfaces comprises a pasty mass made by dry mixing a linear alkyl benzene sulfonic acid and soda ash followed by neutralization with a caustic solution, active organic acids and a filler. A method of making the composition is also provided.

15 Claims, No Drawings

PASTY ACID DETERGENT COMPOSITION the present invention relates to pasty detergent compositions which contain acidic cleaning components and which may be incorporated into multiple use scrubbing pads. The resulting scrubbing pads are particularly useful as a bathroom or tub-and-tile hard surface cleaner, being able to facilitate the removal of soap scum and lime scale.

The problem of cleaning soap scum and lime scale from household surfaces such as sinks, tubs, tiles, walls, and floors is well known. These bathroom surfaces are subject to deposits of soap scum, the insoluble calcium and magnesium soaps produced by the reactions of hard water with water soluble sodium soaps. Additionally, the hard water when it dries on such surfaces, deposits various mineral salts. Such deposits tenaciously cling to the substrate upon which they are deposited and are difficult to remove using conventional (alkaline soap or detergent) cleaning materials.

Consequently, the art has gone to acid cleaning compositions to remove soap scum and lime scale from bathroom surfaces. To be effective, these cleaners have been in liquid form, generally aqueous solutions at relatively low pH's to have an acid concentration sufficiently strong to redissolve the soap scum and lime scale. The drawback of such hard surface cleaners has been the fact that they tend to drip down the surfaces upon which they are applied. Some of these have been aerosol products that apply a foam to the soiled surfaces which begins to drip after the foam breaks down. The treated surfaces are wiped with a sponge, pad, or rag to mechanically remove the soil, and then rinsed with a clean rag or sponge.

According to the present invention, a gluey detergent paste composition is provided which serves both as an active cleaning component and as a carrier for organic acids that are particularly suited to remove lime scale and soap scum. This pasty composition comprises the reaction product of a linear alkyl benzene sulfonic acid mixed stepwise with soda ash to form a dry mix and then neutralized with a caustic solution. The resultant mass forms a paste that is gluey and is mixed with organic acid cleaning components and fillers, softeners, and other detergent ingredients known to the art.

The foregoing paste containing the gluey detergent composition is filled into a scrubbing pad or the like, which provides both chemical and mechanical cleaning of bathroom surfaces. The structure of such scrubbing pads will be apparent to those skilled in the art.

The pasty detergent composition is made by steps including the dry mixing a linear alkyl benzene sulfonic acid with soda ash. This mixture is then reacted with a caustic solution which neutralizes the linear alkyl benzene sulfonic acid and entraps the soda ash in a gluey mass. To this gluey mass is added the active acid cleaning components and such filler material as may be appropriate.

It has been surprisingly discovered that the order of addition of the components is critical to the production of a pasty, gluey mass. If the caustic is added to neutralize the linear alkyl benzene sulfonic acid before the soda ash is added, a dry puffy and puffed up mass that is nonsticky, friable and brittle is formed, which friable or brittle mass is unsuited for use in a paste and would not bind the other dry ingredients to it.

To the pasty, gluey mass is added an active organic acid component and a filler so that the resulting composition has a pH of about 2.5 to 5.5.

Among the effective linear alkyl benzene sulfonic acids are those having 10 to 22 carbon atoms in the alkyl group. Dodecyl benzene sulfonic acid is the preferred acid. The linear alkyl benzene sulfonic acid will be present in an amount from 10 to 40% by weights, more preferably about 20 to 30% by weight, and most preferably about 25% by weight.

Soda ash (or sodium carbonate) is essential and stoichiometric amounts based upon the linear alkyl benzene sulfonic acid will be presented so that for every 5 parts by weight of linear alkyl benzene sulfonic acid there will be 1 part soda ash.

By the same token the caustic is usually caustic soda, a 50% solution of sodium hydroxide, although caustic potash (potassium hydroxide) may be used where a more soluble paste is desired. The caustic is added stoichiometrically to the linear alkykl benzene sulfonic acid as well as having also 1 part caustic to 5 parts linear alkyl benzene sulfonic acid.

The ranges of soda ash and caustic may be from 1 to 8% each, depending upon the amount of linear alkyl benzene sulfonic acid to be neutralized. When 25% linear alkyl benzene sulfonic acid is used, 5% each of soda ash and caustic are used and it is unnecessary to add additional water to form a paste and the paste formed is sufficiently moist to mix with the other ingredients and bind them in the pasty mass. The resulting paste will have from 1 to 10% total moisture, preferably 2–8% and ideally about 5% moisture so that the pasty mass is neither porous nor rock hard, but is pliable and elastic.

The active organic acid component will be a dibasic or polycarboxylic acid. Especially suitable are succinic acid, glutaric acid, and adipic acid and mixtures thereof and citric acid. The acid should be present in an amount effective to lower the pH to from about 2.5 to 5.5, more preferably from about 3.5 to 4.5 and ideally to about 4.

The following examples are given to illustrate the nature of the invention, but it will be understood that the invention is not limited thereto,

EXAMPLE 1

In a 1 gallon Hobart mixer with a sigma blade 500 g of dodecylbenzene sulfonic acid and 100 g of soda ash (FMC-100) were added and the materials were dry mixed at medium speed. Thereafter, 100 g of a 50% caustic solution was added to the mixer and the neutralization reaction proceeded under stirring for about 5 minutes until there was no more swelling of wetted mass. The temperature rose to about 60° C. Then 400 g of a mixture of dibasic acids was added. The acidic mixture contained about 60% glutaric acid, 27% succinic acid and 11% adipic acid acid manufactured by DuPont and sold under the name DAGS. The mixer speed was increased to thoroughly disperse the organic acids in the pasty mass and then 890 g of sodium sulfate was added to the mixture with 10 g of a fragrance solution. The mixing continued until the total mixing time was about 15 minutes. The paste formed was examined and had a high density. It was soft paste which was pliable after one hour. 150 g of the paste was filled into a scrubber having a cross-linked polyethylene foam cavity which forms the handle and a non-woven polyester web serving as the scrubber pad surface. The hand feel of the scrubber was good being pliable to hand pressure.

EXAMPLE 2

By a similar process, another batch of the organic acid paste was prepared in the one gallon Hobart mixer by adding 250 g of dodecyl benzene sulfonic acid and 70 g of soda ash to the mixing bowl followed by 30 g of a 50% caustic solution to bring about neutralization. Then, 200 g of the mixture of dibasic acids sold as DAGS was added followed by 445 g of sodium sulfate and 5 g of fragrance solution. Using the same reaction conditions a similarly dense paste was formed. This paste was a dry paste which hardened after one hour and when charged into a scrubber produced a hand feel that was hard and unyielding.

EXAMPLE 3

A formula similar to that of Example 2 was made in the Hobart mixer having 250 g of dodecyl benzene sulfonic acid, 70 g of soda ash, 30 g of a 50% caustic solution, 200 g of the DAGS dibasic acid mixture, 415 g of sodium sulfate, 30 g of water, and 5 g of fragrance solution. Under the process conditions of the previous examples, a high density paste was formed which was very soft and stayed very soft after one hour. Scrubbers loaded with this paste had a good, very soft hand feel; and there was high swelling when they were used.

EXAMPLE 4

For composition, an alkaline cleaning paste was prepared in the Hobart mixer. To 150 g of water was added 193 g of light soda ash. Then a premixture of 251 g of dodecyl benzene sulfonic acid and 93 g of sulfonic acid was gradually added to the mixing bowl and mixed for 5 minutes. The temperature of the reaction reached about 65° C. Then, 46 g of a 50% caustic solution and 262 g of calcium carbonate were added to the mixer under stirring. The reaction vessel was permitted to cool to about 45° C., and 5 g of fragrance solution was added. 150 g of the alkaline paste was charged into a scrubber. This paste was pliable and had a good hand feel.

PENETROMETER TESTS

In order to further evaluate the suitability of the pastes for use in scrubbers, the relative hardness of paste samples was assessed one day after manufacture using a Precision Universal Penetrometer, G.C.A. Corporation, Chicago, Ill. 200 g samples of paste were formed into cylinders 3 inches in diameter and 1 inch in depth. A 35 g aluminum cone was used in the apparatus and the testing done in accordance with ASTM methods D217 and D937. The higher the reading, the softer the sample. Preferred hardness is in the range of from 4–10 mm penetrations. The results are shown in Table I.

TABLE I

| Paste Sample | Swelling | Hardness data (mm penetration) | Average |
|---|---|---|---|
| Example 1 | low | 7.3, 6.8, 8.6, 7.8 | 7.6 |
| Example 2 | low | 2.1, 1.6, 1.6, 1.6 | 1.7 |
| Example 3 | high | 16.8, 17.3, 17.5, 16.0 | 16.9 |
| Example 4 | low | 8.2, 9.6, 8.0, 9.0 | 8.7 |

From this data, it is seen that Examples 1 and 4 have the desired hardness to deliver active ingredients. The swelling of Example 3 results in lower density and faster product consumption due in part to carbon dioxide generation.

Comparative tests of the pastes of Examples 1 and 4 for the removal of soap scum by chemical action alone showed that the alkaline paste of Example 4 removed about 15% soap scum while the acid paste of Example 1 removed about 45% of the soap scum. Using mechanical action of the instant scrubbers it was found that an additional 15.6% of the soap scum was removed with the scrubber alkaline paste combination of Example 4, while the scrubber acid paste composition of Example 1 removed another 26.4% of the soap scum. The scrubber-acid paste combination of Example 1 is definitely superior.

EXAMPLES 5-10

Additional acid pastes were made up on a parts by weight basis as tabulated below to optimize the formula of the paste.

| | Example # | | | | | |
|---|---|---|---|---|---|---|
| | 5 | 6 | 7 | 8 | 9 | 10 |
| Dodecyl benzene sulfonic acid | 25 | 25 | 25 | 25 | 25 | 25 |
| Soda ash (FMC-100) | 5 | 5 | 5 | 5 | 7 | 7 |
| Caustic soda (50% NaOH) | 5 | 5 | 5 | 5 | 3 | 3 |
| DAGS* | 20 | 20 | 20 | 20 | 20 | 20 |
| Sodium sulfate | 41.5 | 42.5 | 43.5 | 44.5 | 41.5 | 44.5 |
| Water | 3. | 2. | 1 | 0 | 3 | 0 |
| Fragrance Solution | 0.5 | 0.5 | 0.5 | 0.5 | 0.5 | 0.5 |
| Paste consisting (1 = Soft, 5 = hard) | | | | | | |
| after processing | 1 | 1 | 1 | 2 | 1 | 2 |
| after 1 day | 2 | 1 | 2 | 2 | 2 | 3 |
| after 1 week | 3 | 2.5 | 3 | 4 | 2.5 | 4.5 |

*DAGS is a mixture of diabasic acids containing 60% glutaric, 27% succinic acid and 11% adipic acid available from DuPont.

Examples 5, 7, and 8 are preferred, with Example 8 being most preferred.

Acid paste compositions can be prepared using pure fractions of the dibasic acids. From 10–40% glutaric acid or succinic acid or adipic acid may be used in the composition. It is more preferred that the acid be present in an mount of from 20–30% by weight and most preferably around 25% by weight. This acid will be effective to redissolve the soap scum, and with the neutral surfactant system in the paste, be able to wash away the redissolved material.

A polycarboxylic acid such as citric acid may also be used to lower the pH of the composition to be an effective active organic acid ingredient. It should be present to lower the pH to between 2.5 and 5.5, more preferrably to between 3.5 and 4.5, and most preferrable to around pH 4.

The invention provides an odorless white paste that is pliable and soft rather than brittle or friable and which has sufficient density to permit multiple uses of a scrubber pad containing 150 g of the paste without too rapid a rate of use up.

A damper paste may be made by increasing the amounts of linear alkyl benzene sulfonic acid, soda ash, and caustic solution and decreasing the amount of filler. More surfactant will be released and the rate of consumption will be increased. About 40% linear alkyl benzene sulfonic acid, 8% soda ash, and 8% caustic are the maximum amounts of ingredients to make the pasty, gluey component of the present composition.

To make a paste that is relatively freer of surfactant as little as 10% linear alkyl benzene sulfonic acid may be used. Then, the soda ash will be about 2% as will the caustic solution. In such paste compositions it will be necessary to add water so that the moisture of the finished product is up to about 8%. This moisture assists in binding the dry ingredient to the pasty mass.

The invention has been described with respect to various illustrative and preferred embodiments thereof but is not to be limited to these because it is evident that one skilled in the art, with the present specification before him, will be able to utilize substitutes and equivalents, without departing from the spirit of the invention.

I claim:

1. The method of manufacturing a polycarboxylic acid containing pasty detergent composition which is pliable and which comprises the steps of: first dry mixing a linear alkyl benzene sulfonic acid with soda ash, and then neutralizing the linear alkyl benzene sulfonic acid containing mixture with a solution of caustic to form a gluey pasty mass, and subsequently adding thereto an active polycarboxylic acid and a filler to form the final paste.

2. The method of claim 1 wherein the linear alkyl benzene sulfonic acid is present in an amount from 10 to 40% by weight of the total composition.

3. The method of claim 2 wherein the linear alkyl benzene sulfonic acid is present in an amount from 20 to 30% by weight of the total composition.

4. The method of claim 1 wherein the alkyl group of the linear alkyl benzene sulfonic acid has from 10 to 22 carbon atoms.

5. The method of claim 1 wherein the linear alkyl benzene sulfonic acid is dodecylbenzene sulfonic acid.

6. The method of claim 1 wherein the soda ash is present in an amount from 1 to 8% by weight of the total composition.

7. The method of claim 1 wherein the caustic solution is a 50% solution of caustic soda and is present in an amount from 1 to 8% by weight of the total composition.

8. The method of claim 1 wherein the active polycarboxylic acid is selected from the group consisting of polycarboxylic acids, and mixtures of polycarboxylic acids and is in sufficient quantity so as to lower the pH of the detergent composition to between 2.5 and 5.5.

9. The method of claim 8 wherein the polycarboxylic acids are glutaric acid, succinic acid, and adipic acid.

10. The method of claim 8 wherein the active polycarboxylic acid comprises a mixture of glutaric acid, succinic acid, and adipic acid.

11. A polycarboxylic acid containing pasty detergent composition comprising the combination of a neutralized paste made from dry mixing 10–40% linear alkyl benzene sulfonic acid, wherein said alkyl group has 10–22 carbon aoms, with 1–8% soda ash and reaction with 1–8% of a solution of caustic, an active polycarboxylic acid such that said composition has a pH of 2.5–5.5, and a filler.

12. The composition of claim 11 wherein the linear alkyl benzene sulfonic acid is dodecylbenzene sulfonic acid.

13. The composition of claim 11 wherein the polycarboxylic acid is selected from the group consisting of glutaric acid, succinic acid, adipic acid, and mixtures thereof.

14. The composition of claim 11 which comprises from 10–40% dodecylbenzene sulfonic acid, 2–8% soda ash, 2–8% caustic, 10–40% of a mixture of glutaric acid, succinic acid and adipic acid, and 25–75% sodium sulfate.

15. The composition of claim 11 having 25% dodecylbenzene sulfonic acid, 5% soda ash, 5% caustic solution, 20% of a mixture of glutaric acid, succinic acid and adipic acid, 44.5% sodium sulfate and 0.5% fragrance solution.

* * * * *